United States Patent [19]

Schäfer

[11] 4,399,963
[45] Aug. 23, 1983

[54] ELASTIC TAIL SKID FOR GLIDERS AND LIGHT AIR PLANES

[76] Inventor: Herbert Schäfer, 6980 Wertheim-Grünenwört, BRD, Fed. Rep. of Germany

[21] Appl. No.: 356,156

[22] Filed: Mar. 8, 1982

[30] Foreign Application Priority Data

Mar. 13, 1981 [DE] Fed. Rep. of Germany ... 8107304[U]

[51] Int. Cl.³ .............................................. B64C 25/64
[52] U.S. Cl. ................................ 244/104 R; 244/108; 244/109; 280/716
[58] Field of Search ............. 244/104 R, 104 LS, 108, 244/109, 16; 280/8, 9, 10, 11.1 BR, 11.24, 11.27, 11.28, 716; 248/634; 16/18 R, 44; 193/35 F, 35 B; 267/63 A, 153

[56] References Cited

U.S. PATENT DOCUMENTS

| | | | |
|---|---|---|---|
| 1,614,894 | 1/1927 | Nelson et al. | 16/18 R |
| 1,744,572 | 1/1930 | Pendergrass | 244/109 |
| 2,105,374 | 1/1938 | Saulnier | 244/104 LS |
| 2,117,786 | 5/1938 | Blume | 244/109 |
| 3,630,581 | 12/1971 | Gostomski | 280/716 |

Primary Examiner—Trygve M. Blix
Assistant Examiner—Rodney Corl
Attorney, Agent, or Firm—Michael J. Striker

[57] ABSTRACT

A tail skid mounted to the airframe of a glider of a light air plane comprises a body of elastic material, a support plate imbedded in the elastic body and a skid wheel yieldingly supported in a metal frame mounted to the skid body and elastically connected to the support frame.

18 Claims, 3 Drawing Figures

ELASTIC TAIL SKID FOR GLIDERS AND LIGHT AIR PLANES

BACKGROUND OF THE INVENTION

The invention relates to an elastic tail skid for gliders and light air planes with a tail skid to be mounted on the airframe, made of elastic material, and a tail skid element supported in a recess of the tail skid body, establishing the ground support, yieldingly supported on a support plate.

In known tail skids of this type (DE-GM 76 03 610 and 76 09 608) the support plate of the upper face of the tail skid element defined to engage the airframe is mounted loosely thereon, or the support plate is mounted in a flat recess of this tail skid upper face in such a manner that its upper face is flush with the upper face of the tail skid body.

In practice it has been shown that problems occur with respect to making a safe connection between the tail skid body and the airframe.

SUMMARY OF THE INVENTION

It is an object of the invention to provide an elastic tail skid which facilitates in a simple and cost saving manner the connection with the airframe.

This object of the invention is solved in that the support plate is imbedded into the tail skid body.

The inventive solution is based on the realization that with the known tail skids the part of the tail skid upper face, which is covered by the support plate, is lost for the connection with the air-frame. By imbedding the support plate into the tail skid body, the total upper face of the tail skid body remains available for the connection with the airframe in an advantageous manner. In this manner, the usable connection face is considerably increased. At the same time, all limitations with respect to the support plate are eliminated.

The support plate can be preferably molded into the tail skid body which preferably consists of rubber. In a further embodiment of the invention the upper face of the tail skid body defined for engagement with the airframe is mechanically roughened and preferably prepared with an adhesive, for example, a rubber adhesive. Such a pretreatment of the upper face of the tail skid adds to the safe connection of the tail skid and the airframe. In practice, all conventional adhesives may be used, due to such a preparation, so as to mount the tail skid onto the airframe.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
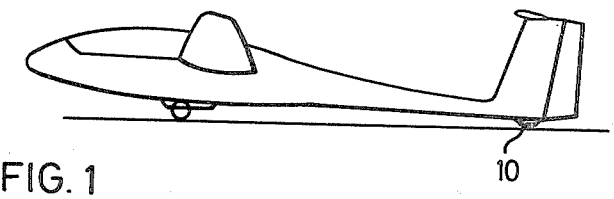
FIG. 1 is a side view of an airplane, which shows the arrangement of the tail skid on the airframe.
Figure 2:
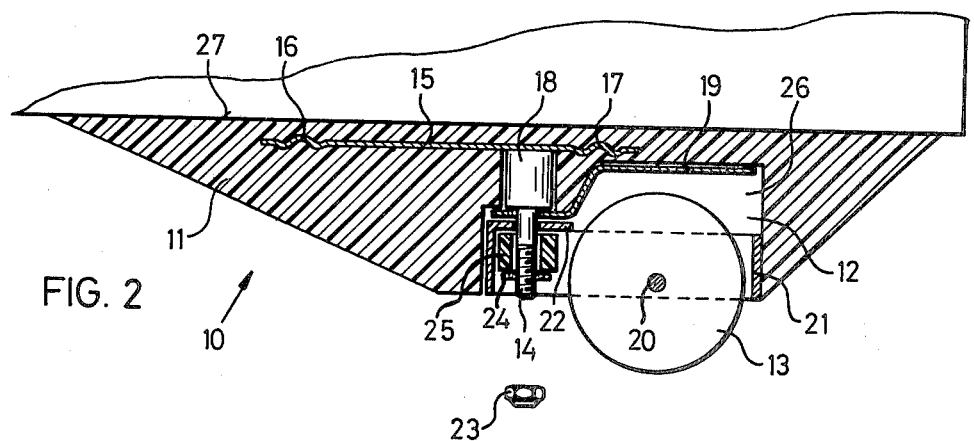
FIG. 2 is a longitudinal section of a roller tail skid along line II—II of FIG. 3, in accordance with the invention.
Figure 3:
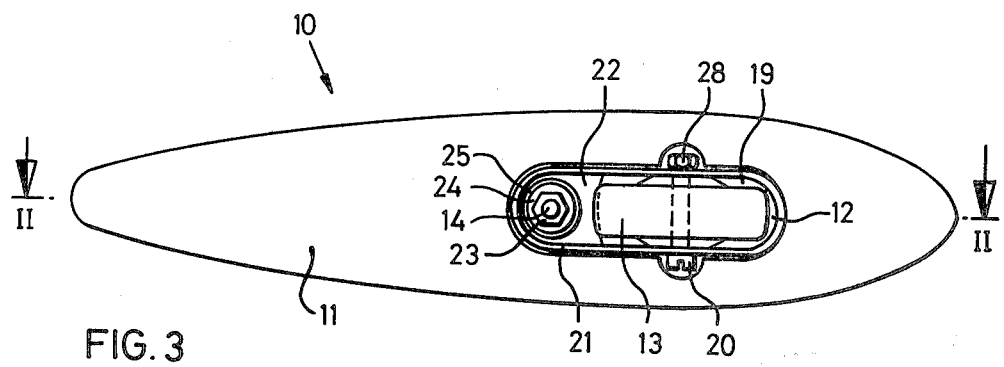
FIG. 3 is a view of the tail skid from below.

As can be seen from FIGS. 2 and 3, the tail skid generally designated with reference numeral 10 illustrated in FIG. 1, is provided with a tail skid body 11 made of elastic material, in particular rubber. The tail skid body is provided with a recess 12, wherein a tail skid wheel 13 is yieldingly supported. For this purpose, the tail skid 10 is provided with a vertical spacer bolt 14 which with its upper portion is connected with a support plate 15, for example, welded or soldered. The support plate 15 is molded into the tail skid material with the exception of the engagement face of the vertical spacer bolt 14. In order to support the mutual connection of the support plate 15 and tail skid body 11, the support plate 15 is corrugated at both ends, as indicated at 16 and 17.

The vertical spacer bolt 14 is provided with a collar 18 of a larger diameter at its upper area. The lower face of collar 18 forms a support face for a deflected steel leaf spring 19. On its one end spring 19 is provided with a bore, through which the smaller diameter of the vertical spacer bolt 14 extends. The steel leaf spring 19 covers the bottom of the recess 12. It provides for stabilization, and particularly favorable spring characteristics in the direction of the height axis. If desired, a second shorter steel leaf spring may engage on a portion of the spring 19 in a known manner (DE-GM 76 09 608).

The tail skid wheel 13 is rotatably mounted on a wheel axis which is shaped as an axis screw 20. The axis screw 20 in turn is supported on a metal frame 21. The metal frame 21 is provided with a bottom 22 on its front end which is pushed onto the vertical spacer bolt 14 in the same manner as spring 19. An axis nut 28 is mounted on the thread end of the axis screw 20 (FIG. 3).

The metal frame 21 is pressed, together with its bottom 22 against the steel leaf spring 19 and the collar 18 of the vertical spacer bolt 14 by means of a safety nut 23 which is screwed to the lower end of the vertical spacer bolt 14 by means of a washer 24 and a bushing 25 made of elastic material, for example, a fibroflex bushing.

Due to the illustrated mounting of the tail skid wheel 13 a considerable elasticity is obtained in a vertical direction. The spring may be up to 15 mm and more. If needed, one could eliminate the steel leaf spring 19. Instead, none-elastic steel elements or aluminum press or molded parts may be provided. In such a case, the spring force can be provided alone by the bushing 25 or similar elastic structural parts, for example, a spiral pressure spring. In addition to the elasticity in the vertical direction, a pivotability of the tail skid wheel 13 about an angle of, for example, 7° may be obtained in the horizontal plane to both sides with reference to the longitudinal symmetry axis of tail skid 10, in the shown type of the support of frame 21 on the vertical spacer bolt 14 in connection with the elasticity of the material of the tail skid body 11.

The tail skid body 11 may be so dimensioned or designed in the range of recess 12, that the side walls 26 formed by the tail skid body tear when extreme side forces are exerted on the tail skid wheel 13. In this case, the metal frame 21 can rotate around the vertical spacer bolt 14, whereby the transmission of the side forces on the airframe are substantially reduced.

The upper face 27 of the tail skid body 11 is mechanically roughened and prepared with a rubber adhesive, so as to facilitate the mounting of the tail skid 10 on the airframe during assembly.

In a known manner (DE-GM 76 09 608) a collector shoe may be provided, instead of a tail skid wheel. If needed the skid tail wheel and the collector shoe may be exchanged with each other.

It will be understood that each of the elements described above, or two or more together, may also find a useful application in ther types of tail skids differing from the types described above.

While the invention has been illustrated and described as embodied in an elastic tail skid for gliders or light air planes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An elastic tail skid for gliders and light air planes, comprising a tail skid body to be mounted on the airframe, said body being made out of elastic material and formed with a recess; a skid element establishing a ground support when the glider or air plane is landed, said skid element being mounted in said recess; a support plate imbedded in said body, said skid element being yieldingly supported on said support plate; and a vertical spacer bolt rigidly mounted on said support plate, said skid element having a front end and being pivotally supported with said front end relative to said vertical spacer bolt.

2. The tail skid as defined in claim 1, said skid body being injection molded around said support plate.

3. The tail skid as defined in claim 1, wherein said tail skid body has an upper face which engages the airframe when the tail skid is mounted thereon, said upper face being mechanically roughened.

4. The tail skid as defined in claim 3, wherein said upper face is coated with an adhesive.

5. The tail skid as defined in claim 4, wherein said adhesive is a rubber adhesive.

6. The tail skid as defined in claim 3, further including a metal frame mounted in said recess, said recess having a wall engaging said metal frame.

7. The tail skid as defined in claim 6, wherein said skid element is mounted in said metal frame.

8. The tail skid as defined in claim 7, said metal frame having a bottom wall on its front end, said skid body having a support face in said recess, said bottom wall facing said support face.

9. The tail skid as defined in claim 8, said bottom wall being formed with an opening, said spacer bolt extending through said opening into said metal frame.

10. The tail skid as defined in claim 9, further including at least one leaf spring, said recess having a bottom surface, said leaf spring engaging said support face and said bottom surface of said recess.

11. The tail skid as defined in claim 10, said bottom wall of said metal frame being pressed against said leaf spring.

12. The tail skid as defined in claim 10, said leaf spring is made out of steel.

13. The tail skid as defined in claim 9, wherein said bottom wall is pressed against said support face.

14. The tail skid as defined in claim 13, further comprising means for pressing said bottom wall, said pressing means including an intermediate bushing mounted on said spacer bolt and a nut screwed onto an end of said spacer bolt, said nut and said bushing pressing said bottom wall of said metal frame in its position in said recess.

15. The tail skid as defined in claim 14, wherein said intermediate bushing is made out of elastic material.

16. The tail skid as defined in claim 15, wherein said skid element is a yieldingly supported tail skid wheel.

17. The tail skid as defined in claim 15, wherein said support plate is formed with anchoring means for ensuring the connection of said support plate in said skid body.

18. The tail skid as defined in claim 17, wherein said anchoring means are defined by corrugations formed at opposite ends of said support plate.

* * * * *